E. B. MEATYARD.
Car-Wheels.

No. 151,609. Patented June 2, 1874.

Witnesses:
Heinrich F. Binns.
Henry J. Peet

Inventor:
Edward B. Meatyard
By Coburn & Munday
his Attorneys

UNITED STATES PATENT OFFICE.

EDWARD B. MEATYARD, OF SHIPMAN, ILLINOIS.

IMPROVEMENT IN CAR-WHEELS.

Specification forming part of Letters Patent No. 151,609, dated June 2, 1874; application filed February 26, 1874.

*To all whom it may concern:*

Be it known that I, EDWARD B. MEATYARD, of Shipman, in the county of Macoupin and State of Illinois, have invented certain Improvements in Elastic Railway-Car Wheels, of which the following is a specification:

This invention relates to making useful the elasticity in the body of the wheel between the axle and the tire; and it consists in making the body of the wheel between the parts mentioned of metallic disks, extending from the inner portion of the rim to the hub in curved cones, base to base, said disks being cut for a portion of their surface with radial slits to make the wheel more yielding, all of which will be further herein considered.

Figure 1:
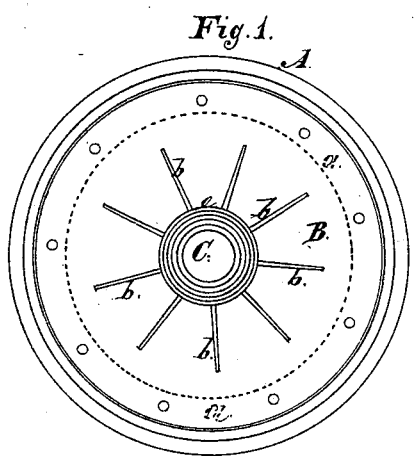
Figure 2:
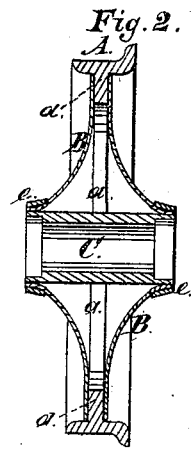

In the accompanying drawings, which form a part of this specification, Figure 1 shows the front or side of the wheel, and Fig. 2 is a vertical central section of the same.

In the said drawing, A represents the rim or tire, which may be cast. This rim A is made with a central flange or rib, $a$, of such section and form as will best preserve the circular shape of its rim. To this rib $a$ the bases of the disks B are firmly fastened. These disks B should be preferably made of charcoal-iron, hammered to shape, or possibly of tempered steel, and may be formed from flat circular plates of proper dimensions. Then, after a suitable aperture is cut at the center, the radial slits $b$ are cut from near the central hole toward the circumference, stopping short, however, of the entire distance, to leave an ample margin of uncut metal. The inner ends of the leaves of each disk merge into an uncut portion of said disk, which is in a plane parallel with the plane of the uncut portion, which fastens to the tire. The object in leaving an uncut portion next the central hole of each disk is to secure accuracy and save trouble in fastening the disk to the hub $c$. Overlying bands $e$, shrunk or forced on, secure the disks B to the hub C. I do not wish to limit myself to any detailed method for securing these hub-bands in place. It will be seen, by referring to Fig. 2 of the drawing, that a section of the disk curves, substantially as is the case in a section of the well-known expansion-joint used in steam-engineering, from the vertical at point of attachment to rim-rib $a$ to the horizontal at the point of attachment to the hub. This curve is the same, of course, around the entire wheel. It must now be obvious that, whatever point of the tire rests upon the rail, every spoke or leaf of each disk is affected by the load, which the wheel transmits to the track—those on the same level and above the axle tensilely, those below compressively—and all, except such as are horizontal, take weight from the axle to the tire or rim. The stiffness of the tire or rim transmits weight from nearly every point of its circumference whenever the wheel is loaded.

The utility of a yielding body for car-wheels to meet lateral as well as vertical jolts and shocks is so well known that it is not deemed necessary here to specify it.

I am well aware that a patent has been granted to Perry G. Gardiner, dated May 1, 1847, and also to W. H. Devalin, dated September 1, 1868; and I disclaim all such as my invention, because there is a great difference between the devices therein shown and my present invention.

Having described my invention, I claim as new and desire to secure by Letters Patent—

The elastic car-wheel consisting of the rim A $a$, the hub C, and the curved radially-cut disk B, secured to the rib $a$ of the rim A, and to the hub C, by suitable means, all combined substantially as specified.

EDWARD B. MEATYARD.

Witnesses:
   M. W. SEAMAN,
   GEORGE HARDY.